A. HOPFEN.

Combined Soap and Shaving Box.

No. 8,918. Reissued Sept. 30, 1879.

WITNESSES-

Chas. O. Gill

Wm. Thos. Smith.

INVENTOR-

Anton Hopfen

By his attys.

Cox and Cox.

N. PETERS, PHOTO-LITHOGRAPHER, WASHINGTON, D. C.

UNITED STATES PATENT OFFICE.

ANTON HOPFEN, OF NEW YORK, N. Y.

IMPROVEMENT IN COMBINED SOAP AND SHAVING BOXES.

Specification forming part of Letters Patent No. 192,997, dated July 10, 1877; Reissue No. 8,918, dated September 30, 1879; application filed March 13, 1879.

*To all whom it may concern:*

Be it known that I, ANTON HOPFEN, of New York, in the county and State of New York, have invented certain new and useful Improvements in Combined Soap and Shaving Boxes; and I do hereby declare that the following is a full, clear, and exact description thereof, reference being had to the accompanying drawings.

The nature of my invention consists in the construction and arrangement of a soap and shaving box, as will be hereinafter more fully set forth.

Figure 1:
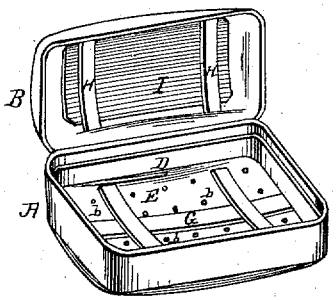
Figure 2:
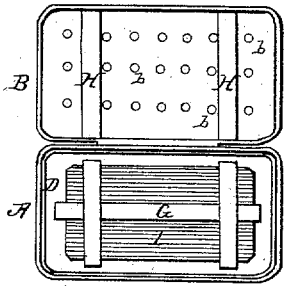
Figure 3:
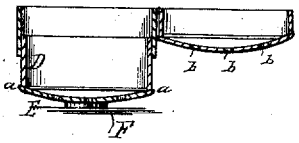

Figure 1 is a perspective view, Fig. 2 is a plan view, and Fig. 3 is a cross section, of a device embodying the elements of the invention.

The combined soap and shaving box is composed of three main parts—the body A, which is simply a rim of any suitable form and size, a lid, B, hinged to said body, and a bottom, E, provided with an upwardly-extending rim, D, that fits within the body A.

The body A and the rim D are made slightly tapering, so that the box can be extended by putting out the bottom; but said parts cannot easily be separated. The bottom E extends beyond the rim D sufficiently to form a shoulder, *a*, which prevents said bottom from being pushed inward into the body A.

The lid B and bottom E are preferably made convex, as shown, on their outer faces, and provided with numerous perforations, *b*, for the escape of moisture. On the under side of the bottom E is formed a foot or pedestal, F, projecting sufficiently far below the bottom, so that when the box is put down there will be room for a free circulation of air into and through the box.

The box thus constructed may be made of metal, rubber, wood, or other suitable material.

In the bottom of the box is a rack, G, and on the inside of the lid are strips or cross-bars H H, to prevent the soap from coming close to the bottom and lid of the box, which would close the perforations in them and therefore destroy one of the objects of the invention—to permit a free circulation of air through the box around the soap.

This box is specially intended for travelers, and can be used as a shaving-box by extending the box and placing a pad, I, of rubber or other suitable material, in the bottom to close the perforations therein. This pad I may be carried, ordinarily, in the lid B, between it and the strips H.

What I claim as my invention, and desire to secure by Letters Patent, is—

1. A combined soap and shaving box, composed of the body A, perforated lid B, and perforated bottom E, with sliding rim D, substantially as herein set forth.

2. The rack G and strips H, in combination with the box having perforated lid and bottom, for the purposes herein set forth.

3. In combination with a soap-box having a perforated bottom, the pad I, substantially as set forth.

In testimony that I claim the foregoing I have hereunto set my hand this 26th day of February, 1879.

ANTON HOPFEN.

Witnesses:
CHAS. C. GILL,
WM. BRO. SMITH.